(12) United States Patent
Cho et al.

(10) Patent No.: US 11,658,308 B2
(45) Date of Patent: *May 23, 2023

(54) FUEL CELLS AND METHOD OF MANUFACTURING

(71) Applicant: CellMobility, Inc., Berkeley, CA (US)

(72) Inventors: Yong-Hun Cho, Kyunggi-do (KR); Hyelim Choi, Seoul (KR); Ok-Hee Kim, Busan (KR); Yung-Eun Sung, Kyunggi-do (KR); Heeman Choe, Walnut Creek, CA (US)

(73) Assignee: CellMobility, Inc., Berkeley, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/202,145

(22) Filed: Mar. 15, 2021

(65) Prior Publication Data

US 2021/0351414 A1 Nov. 11, 2021

Related U.S. Application Data

(62) Division of application No. 13/930,887, filed on Jun. 28, 2013, now Pat. No. 10,978,715.

(30) Foreign Application Priority Data

Jun. 28, 2012 (KR) ........................ 10-2012-0070105

(51) Int. Cl.
*H01M 4/88* (2006.01)
*H01M 8/1004* (2016.01)
(Continued)

(52) U.S. Cl.
CPC ......... *H01M 4/8807* (2013.01); *H01M 4/661* (2013.01); *H01M 4/808* (2013.01);
(Continued)

(58) Field of Classification Search
None
See application file for complete search history.

(56) References Cited

U.S. PATENT DOCUMENTS

2009/0023047 A1 1/2009 Kume
2009/0111001 A1 4/2009 Otake
(Continued)

OTHER PUBLICATIONS

Carl A. Reiser et al., "A Reverse-Current Decay Mechanism for Fuel Cells," Electrochemical and Solid-State Letters, 2005, 8 (6) A273-A276 (2005), pp. A273-A276.
(Continued)

*Primary Examiner* — Amanda J Barrow
(74) *Attorney, Agent, or Firm* — Aka Chan LLP (57) ABSTRACT

An innovative fuel cell system with membrane electrode assemblies (MEAs) includes a polymer electrolyte membrane, a gas diffusion layer (GDL) made of porous metal foam, and a catalyst layer. A fuel cell has a metal foam layer that improves efficiency and lifetime of the conventional gas diffusion layer, which consists of both gas diffusion barrier (GDB) and microporous layer (MPL). This metal foam GDL enables consistent maintenance of the suitable structure and even distribution of pores during the operation. Due to the combination of mechanical and physical properties of metallic foam, the fuel cell is not deformed by external physical strain. Among many other processing methods of open-cell metal foams, ice-templating provides a cheap, easy processing route suitable for mass production. Furthermore, it provides well-aligned and long channel pores, which improve gas and water flow during the operation of the fuel cell.

20 Claims, 4 Drawing Sheets

(51) Int. Cl.
*H01M 4/86* (2006.01)
*H01M 4/66* (2006.01)
*H01M 8/0206* (2016.01)
*H01M 4/90* (2006.01)
*H01M 4/80* (2006.01)
*H01M 4/92* (2006.01)
*H01M 8/10* (2016.01)

(52) U.S. Cl.
CPC ....... *H01M 4/8626* (2013.01); *H01M 4/8825* (2013.01); *H01M 4/9041* (2013.01); *H01M 4/9083* (2013.01); *H01M 4/921* (2013.01); *H01M 8/0206* (2013.01); *H01M 8/1004* (2013.01); *H01M 2008/1095* (2013.01); *Y02P 70/50* (2015.11)

(56) References Cited

U.S. PATENT DOCUMENTS

2009/0286125 A1 11/2009 Setlock et al.
2010/0015490 A1 1/2010 Yamada

OTHER PUBLICATIONS

A. Bazylak et al., "Effect of compression on liquid water transport and microstructure of PEMFC gas diffusion layers," Journal of Power Sources 163 (2007), pp. 784-792.

W.R. Chang et al., "Effect of clamping pressure on the performance of a PEM fuel cell," Journal of Power Sources 166 (2007), pp. 149-154.

Jiabin Ge et al., "Effect of gas diffusion layer compression on PEM fuel cell performance," Journal of Power Sources 159 (2006), pp. 922-927.

Deville, Sylvain, Eduardo Saiz, and Antoni P. Tomsia "Ice-templated Porous Alumina Structures." Acta Materialia 55.6 (2007): 1965-974. Web.

Wu, G., K.L. More, C.M. Johnston, and P. Zelenay. "High-Performance Electrocatalysts for Oxygen Reduction Derived from Polyaniline, Iron, and Cobalt." Science 332.6028 (2011): 443-47. Web.

Fife, J.I., J.c. Li, D.c. Dunand, and P.w. Voorhees. "Morphological Analysis of Pores in Directionally Freeze-cast Titanium Foams." Journal of Materials Research J. Mater. Res. 24.01 (2009): 117-24. Web.

Chino, Yasumasa, and David C. Dunand. "Directionally Freeze-cast Titanium Foam with Aligned, Elongated Pores." Acta Materialia 56.1 (2008) 105-13. Web.

Ramos et al., "Preparation and Characterization of Directionally Freeze-cast Copper Foams," Metals 2012, 265-273, published Aug. 9, 2012 (Year: 2012).

Wei et al., "Metal Supported Solid Oxide Fuel Cell by Freeze Tape Casting," ECS Transactions, 35 (1) 379-383 (2011) (Year: 2011).

FUEL CELLS AND METHOD OF MANUFACTURING

CROSS-REFERENCE TO RELATED APPLICATIONS

This patent application is a divisional of U.S. patent application Ser. No. 13/930,887, filed Jun. 28, 2013, which claims the benefit of Republic of Korea patent application 10-2012-0070105, filed Jun. 28, 2012. These applications are incorporated by reference along with all other references cited in this application.

BACKGROUND OF THE INVENTION

The present invention is directed towards fuel cells and method of manufacturing thereof. In this particular embodiment, the developed technique is an improvement to the conventional gas diffusion layer, which consists of the carbon fiber and carbon granule layer. The conventional gas diffusion layer is replaced by a metal foam that provides improved performance, consistent and stable maintenance of the catalyst layer and the porous structure, and resistance to corrosion after operating for a long time.

A fuel cell device directly produces electricity from fuel sources such as hydrogen gas, natural gas, alcohol, and metal sheets, by reacting with oxidants, usually oxygen or air. Fuel cell operation does not involve the combustion of its fuel sources in which energy would be lost through heat. Therefore, the capacity of its thermodynamic efficiency is much higher than that of the average electricity generation process. Furthermore, the only byproduct is water so it does not produce any environmentally harmful byproducts.

Figure 1A:
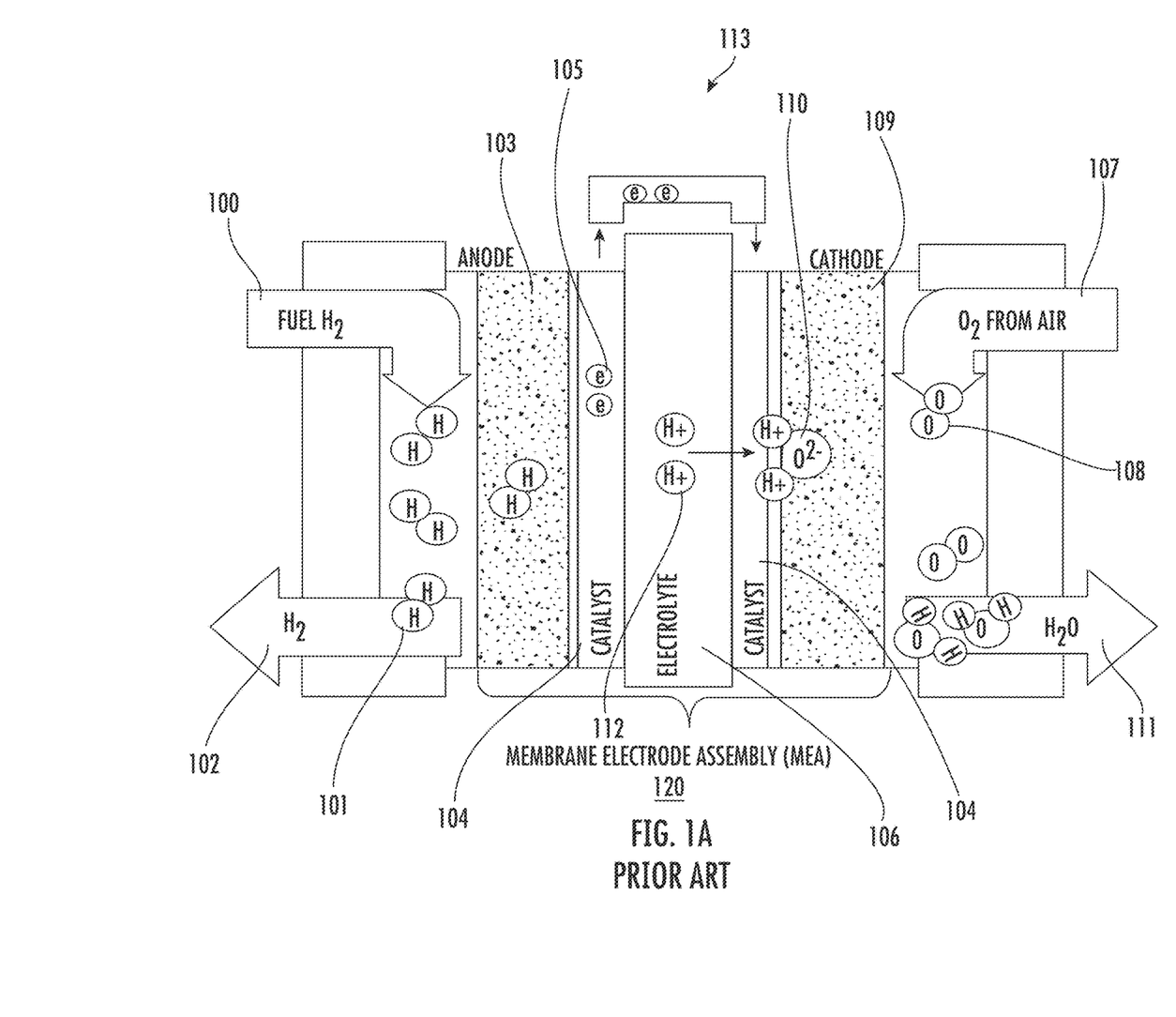
FIG. 1A shows a schematic diagram illustrating the typical structure of a proton electrolyte membrane fuel cell.
Figure 1B:
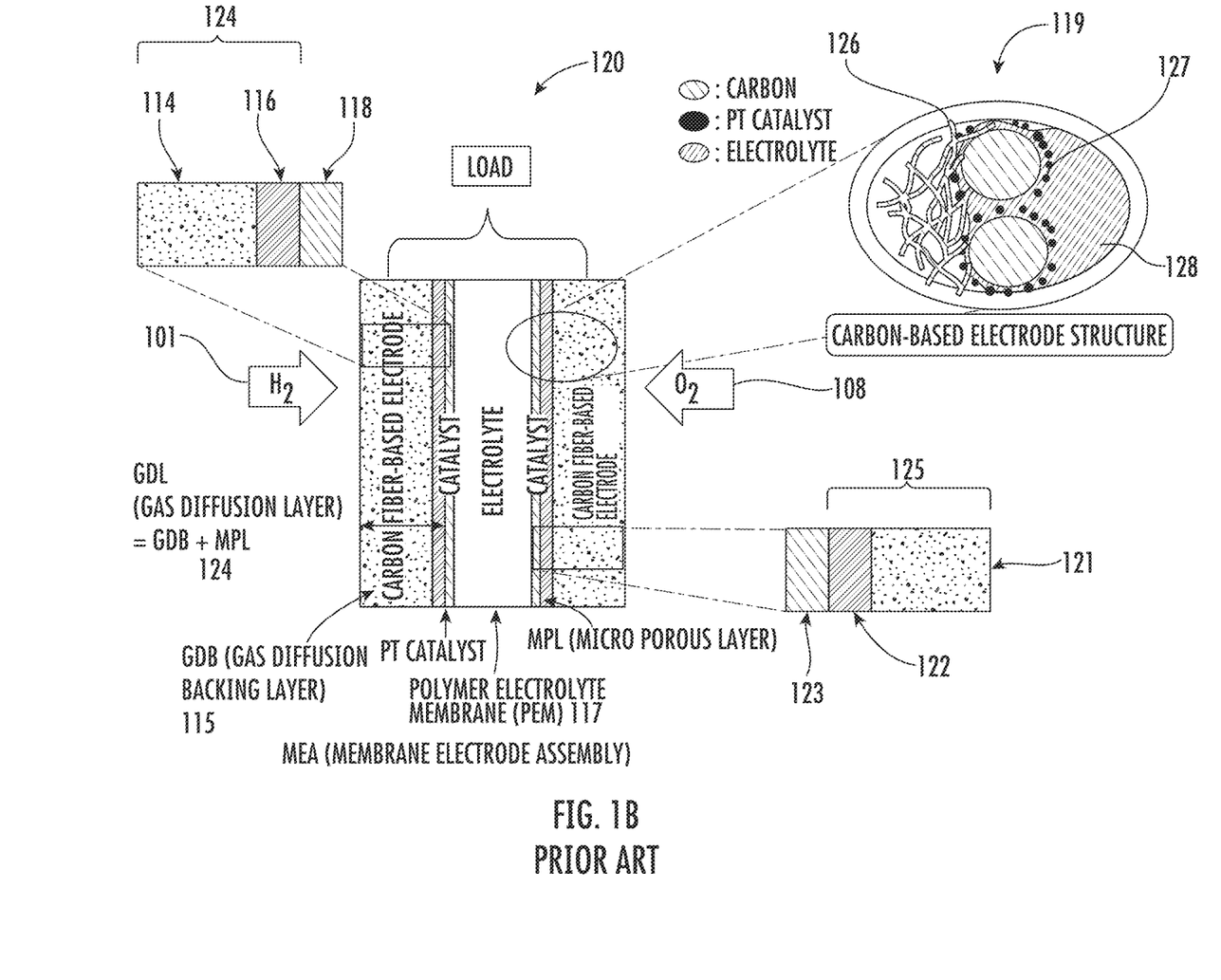
FIG. 1B shows a schematic diagram illustrating the typical structure of a membrane electrode assembly.

FIGS. 1A and 1B show a schematic illustrating the structure of a conventional polymer electrolyte membrane fuel cell (PEMFC). A membrane electrode assembly (MEA) consists of catalytic electrodes attached to both the cathode and anode sides of a polymeric electrolyte membrane where electrochemical reactions take place and hydrogen ions move (FIG. 1A). The gas diffusion layer (GDL) has a unique role of evenly distributing reaction gases and delivering produced electrical energy (FIG. 1B). The gas diffusion layer is comprised of gas diffusion barrier (GDB) and microporous layer (MPL), and plays a vital role in even distribution of fuel gases and physically supports catalyst layer in a fuel cell system.

Also, the gas diffusion layer transports incoming reaction gases from the main channel of the separator (bi-polar plate) for the fuel to catalyst layer, and it removes water produced through chemical reaction by moving it to the separator. In addition, it serves to transfer the electrons generated by electrochemical reactions to the separator.

Therefore, the use of the gas diffusion layer is very important because it helps the chemical reaction take place efficiently to improve the entire efficiency that is directly related to the performance of the fuel cell. The gas diffusion layer acts as electron transport and removes water as the by-product of the chemical reaction. Therefore, the gas diffusion layer's role enhances the efficiency and the performance of the fuel cell, which points to the importance of using a material well suited for such task.

The current carbon-based conventional gas diffusion layer consists of two different materials and is not an optimized material system; that is, it has several drawbacks. First, it is weak against corrosion. Second, it does not have a sufficient long-term durability, because it is a carbon-based material. Third, when it is used with a metallic separator (bi-polar plate) in the assembly of stack, it lacks compatibility with the metal and causes problems in the joining process. Therefore, it is necessary to invent a new advanced material for the GDL that can guarantee both the long-term stability and compatibility with the separator in the operation of a fuel cell.

Since the Second World War, there has been a growing interest in developing a practical fuel cell and rechargeable battery that can produce high capacity electricity. The new technology assures the possibility of the improvement to overcome drawbacks and the need of the fuel cell for military and aerospace purposes has increased. The research of the fuel cell accelerated in the early 1960s due to progressive efforts on reducing air pollution caused by a power plant and an internal combustion engine.

Several different types of the fuel cell could operate and many of them were reformed and used thereafter. The fuel includes hydrogen, methyl alcohol, hydrazine, and the simple structure carbon, and oxygen and air were utilized as the oxidizing agents.

Many kinds of materials are used as electrolytes, such as highly concentrated acidic or basic solutions at the temperature below 150 degrees Celsius, or molten carbonate or other bases at temperatures below 1000 degrees Celsius. In addition, some fuel cells used reformed zirconium oxide as a solid electrolyte with their characteristic ionic conductivity at around 1000 degrees Celsius. Most of the current generation fuel cells utilize a carbon electrode, which is combined with catalysts at low temperatures to increase the reaction rate to certain extent.

A carbon fabric-based gas diffusion layer in polymeric electrolyte fuel cell has a significant following drawback: the porous carbon structure including the catalyst structure will be deformed by corrosion of the carbon support layer after a relatively long operation of the fuel cell, and this causes the loss and unreliability of the platinum catalyst. Furthermore, transport of water and gas is limited due to a difference in pore size between the catalyst layer and GDL. Also, there is an interfacial separation problem due to an excessive interfacial resistance between the catalyst layer and an electrode (the GDL layer).

BRIEF SUMMARY OF THE INVENTION

The present invention provides an innovative fuel cell system with MEAS including a polymer electrolyte membrane, a gas diffusion layer, and a catalyst layer, in which a gas diffusion layer is made of porous metal foam. The present invention also provides a fuel cell comprising one metal foam layer that replaces with improved efficiency and longer lifetime the conventional gas diffusion layer consisting of both gas diffusion barrier (GDB) and microporous layer (MPL). This metal foam gas diffusion layer (GDL) enables having consistent maintenance of the suitable structure and even distribution of pores during the operation. In addition, it produces a fuel cell that is not deformed by external physical strain due to the excellent combination of mechanical and physical properties of metallic foam. Among many other processing methods of open-cell metal foams, ice-templating or freeze-casting provides cheap, easy processing route, which also has excellent capability of mass production. Furthermore, it provides well-aligned and long channel pores, expected to help improve gas and water flow during the operation of the fuel cell.

The present invention relates solutions to overcome the limitations as stated above. An aspect of the invention is to use porous metal foam, which can endure operation at high temperature and prevent electrode corrosion after long term operation, as electrodes in a hydrogen fuel cell.

An aspect of the present invention is to provide a fuel cell comprised of a "single" metal foam layer that substitutes the existing constituents of the gas diffusion layer: gas diffusion barrier (GDB) and microporous layer (MPL).

An aspect of the present invention is to use metal foam as an electrode to have consistent maintenance of the suitable structure and even distribution of pores for the operation. In addition, it provides a GDL material that is not deformed by external physical strain due to the combination of mechanical and physical properties of metallic foam.

Solutions to Problems

The present invention achieves the following: To provide a fuel cell including a polymer electrolyte, a gas diffusion layer, and a catalyst layer, and to form a gas diffusion layer in a fuel cell with single porous metal foam.

A manufacturing process of porous metal foam may include one or more of the following methods: powder sintering, space holder method, ice-template method, dealloying, electrolytic plating, and electroless plating.

For the metal foam, one or more metals are selected from a group consisting of the following metals or their alloys: platinum, palladium, titanium, nickel, copper, aluminum, zirconium, tungsten, cobalt, manganese, magnesium, bismuth, chromium, silver, gold, niobium, tantalum, silicon, iridium, indium, molybdenum, zinc, tin, antimony or mercury, and stainless steel.

In addition, the gas diffusion layer is characterized as a cathode.

In addition, the gas diffusion layer is characterized as an anode.

In an implementation, the present invention provides the method of manufacturing a fuel cell as follows:

(a) Immerse a copper rod into liquid nitrogen and pour a slurry containing water (a freezing medium) and metal particles.

(b) Freeze the metal particles, where ice is interposed between the particles.

(c) Form the porous structure by drying the ice of the slurry below the freezing point, leaving pores in their place.

(d) Form a porous metal foam by sintering in a vacuum furnace.

(e) Finally provides any method of manufacturing fuel cells with manufacturing steps of cutting the porous metal foam and attaching it to the polymeric electrolyte layer as the gas diffusion layer.

In step (e), the present invention is characterized such that the porous metal foam is first bonded with a catalyst layer as the gas diffusion layer and is attached to the polymeric electrolyte layer.

In step (e), the present invention is also characterized such that the polymeric electrolyte layer is first bonded with the catalyst layer, which is then attached to the porous metal foam as a gas diffusion layer.

One or more catalyst is selected from a group of metals consisting of the following Pt-based catalysts: platinum catalyst, platinum-metal alloy catalyst (e.g., metal alloy can be copper, cobalt, nickel, palladium, manganese, chromium, or iron), and metal platinum core shell structured catalyst.

One or more catalyst is selected from a group of metals consisting of the following non-platinum catalysts: cobalt/polyaniline/carbon nanotubes (Co/PANI/CNT), iron/cobalt/carbon (Fe/Co/C), or tungsten carbide/iron/polyaniline (WC/Fe/PANI).

In step (e), methods of attaching platinum catalyst can include spraying, sputtering, electrochemical deposition, chemical vapor deposition (CVD), and atomic layer deposition.

For the metal foam, one or more metals is selected from a group consisting of the following metals and their alloys: platinum, palladium, titanium, nickel, copper, aluminum, zirconium, tungsten, cobalt, manganese, magnesium, bismuth, chromium, silver, gold, niobium, tantalum, silicon, iridium, indium, molybdenum, zinc, tin, antimony, and stainless steel.

Effect of Invention

The present invention provides a fuel cell that replaces the gas diffusion barrier and microporous layer with one layer of metal foam. The metal foam layer prevents corrosion of electrode inside the fuel cell after long operation. Additionally, it also endures high temperature, and consistently maintains the suitable structure and even distribution of pores. Therefore, the mechanical and physical properties of the metal foam provide more stable fuel cell systems.

Other objects, features, and advantages of the present invention will become apparent upon consideration of the following detailed description and the accompanying drawings, in which like reference designations represent like features throughout the figures.

DETAILED DESCRIPTION OF THE INVENTION

The present invention relates to a fuel cell that includes a polymeric electrolyte, a gas diffusion layer, and a catalyst layer, and this fuel cell is novel because, among other features, the gas diffusion layer is formed of porous metal foam. The present invention is described in details in this application and accompanying figures.

FIG. 1A shows a schematic diagram illustrating the typical structure of a proton electrolyte membrane fuel cell (PEMFC) 113, which is sometimes also referred to as a proton exchange membrane fuel cell (also PEMFC). Within the PEMFC 113, there is a membrane electrode assembly (MEA) 120 comprising an anode 103, a cathode 109, an electrolyte 106, and catalyst 104. A hydrogen fuel 100 is supplied to the PEMFC 113. Hydrogen 101, from the hydrogen fuel 100, moves through the anode 103 and is oxidized. Excess hydrogen 101 leaves through outlet 102. Electrons 105 resulting from the oxidation are transported within a catalyst layer 104. The protons 112 resulting from the oxidation reaction are transported across the electrolyte 106. As the protons 112 reach the cathode 109, the protons 112 reacts 110 with oxygen molecules 108. Air 107 is supplied to the cathode. Oxygen molecules 108 from air 107 were transported across the cathode and the oxygen molecules 108 reacts with the protons 112 and produces the water 111.

FIG. 1B shows a schematic diagram illustrating the typical structure of a membrane electrode assembly (MEA) 120 including an anode gas diffusion layer (GDL), a cathode GDL, and a polymer electrolyte membrane (PEM) 117. The anode gas diffusion layer (GDL) 124 generally consists of a first gas diffusion backing layer (GDB) 114 and a first microporous layer (MPL) 116. There is a gas diffusion backing layer 115 that is adjacent the MPL (116) and a platinum catalyst layer. The cathode gas diffusion layer (GDL) 125, generally consists of a second gas diffusion barrier (GDB) 121 and a second microporous layer (MPL) 122. There is a first catalyst layer 118 between the anode GDL 124 and the polymer electrolyte membrane 117. There is a second catalyst layer 123 between the cathode GDL 125 and the polymer electrolyte membrane 117. Hydrogen 101 is supplied to the anode GDL 124. Oxygen 108 is supplied to the cathode GDL 125. There is an enlargement of the carbon-based electrode structure 119. Inside the carbon-based electrode structure 119, there is carbon 126 that is surrounded by platinum catalyst 127 and electrolyte 128.

Figure 2:
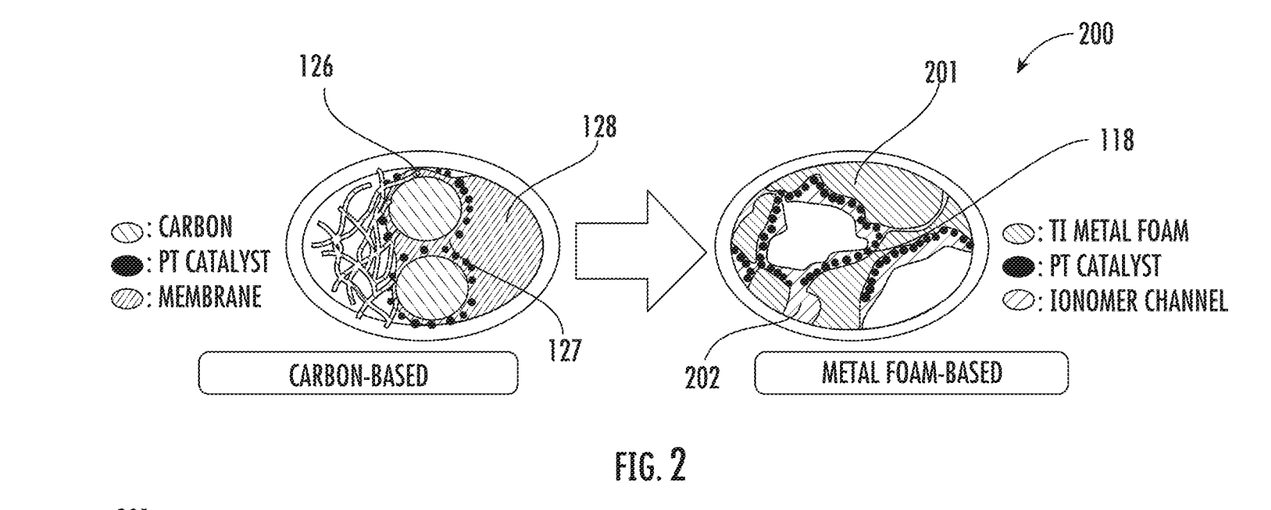
FIG. 2 shows a schematic diagram illustrating the structure of a conventional carbon-based gas diffusion layer.

FIG. 2 is a diagram illustrating a structure of a gas diffusion layer formed of carbon based sheets. This schematic diagram illustrates the structure of a conventional carbon-based GDL formed of carbon fiber layer (MPL) with platinum catalyst 127, carbon paper (GDB) 126, and membrane or electrolyte 128. Carbon 126 is surrounded by platinum catalyst 127 and membrane 128.

Shown on the right in FIG. 2 is a magnified view 200 of a titanium metal foam structure 201 with catalyst 118 and ionomer channel 202. The platinum catalyst is between regions of titanium meal foam and ionomer channel.

Previous fuel cells (specifically, PEMFC) have a gas diffusion layer (GDL) formed by attaching a microporous layer (MPL), such as carbon fiber, to a gas diffusion barrier (GDB), such as felt or paper type. This type of GDL is constructed of a web of carbon fiber felt or paper, or both, and carbonizing resin heated at temperature above 1000 degrees Celsius for full carbonization. And the MPL is constructed by applying a slurry of carbon black and polytetrafluoroethylene (PTFE) onto the premade GDB.

If a carbon-based material is used as a gas diffusion layer, the porous carbon structure including the catalyst structure will be deformed by corrosion of the carbon support layer after a relatively long operation of the fuel cell. This and the difference in pore size between the catalyst layer and the gas diffusion layer lead to the loss of platinum catalyst and limits mobility of the material. Also, an excessive interfacial resistance between the catalyst layer and electrode leads to an interfacial separation problem (i.e., gas diffusion layer).

In applying the metal foam of the present invention as a gas diffusion layer (e.g., an electrode of the fuel cell), it is possible to maintain a suitable catalyst layer or the supporting porous structure during a long operation. It is easy to maintain the catalyst layer structure and porous structure, and it thus increases the fuel cell's resistance to corrosion and high temperature degradation. The porous metal foam or metal foam of the open cell structure is a three-dimensionally connected structure that allows electrons to move without interfacial resistance and is not easily deformed by physical pressure since it basically uses a metal with high mechanical properties.

In an implementation, a titanium metal foam is used for one or more electrodes of the fuel cell. The titanium metal foam has very good mechanical reliability and corrosion resistance. Although other metal foams (e.g., aluminum and copper) can be used as fuel cell electrodes, these other metal foams may not be capable of sustaining an acidic operational environment for as long a period of time as, for example, titanium. Using a freeze casting method in forming a metal foam usually results in elongated channel-like pores. It is possible to form titanium foams with smaller pores (which provide a higher specific surface area because of higher pore density) and less elongated pores by using a higher freezing rate during the freeze casting process. Using such an approach, the pore diameter in this titanium metal foam is on the order of a few tens of microns.

To further enhance electrical conductivity, in an implementation, metal foams with larger pores are used for the cathode, and metal foams with smaller pores are used for the anode. The anode can handle smaller hydrogen molecules that involve less transport resistance, while the cathode can handle larger water and oxygen molecules that involve more transport resistance that impedes gas and fluid flow. Therefore, metal foams with larger pores (e.g., larger diameter) should be used as cathodes in order to improve the electrical conductivity and performance of the fuel cell. A metal foam with larger diameter pores will typically have a lower pore density than a metal foam with smaller diameter pores. In other words, a metal foam with smaller diameter pores has a greater pore density, and hence, a greater surface area than a metal form with larger diameter foams.

In an implementation, the present invention provides a gas diffusion layer with porous metal foam that replaces a carbon-based gas diffusion layer. The porous metal form is an innovative material for the gas diffusion layer of the fuel cell.

Figure 3:
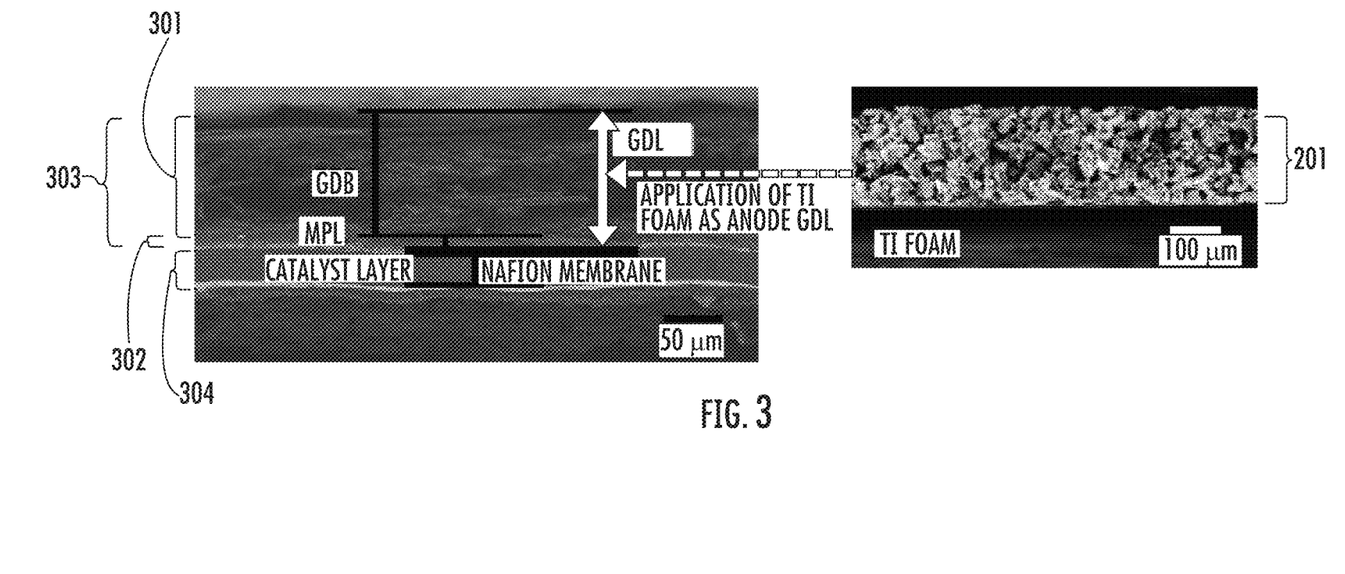
FIG. 3 compares scanning electron microscope images of a conventional carbon-based gas diffusion layer and a gas diffusion layer constructed of metal porous foam.

FIG. 3 compares scanning electron microscope (SEM) images of a conventional carbon-based gas diffusion layer and the new gas diffusion layer constructed of metal porous foam of the present invention. FIG. 3 shows SEM images of a typical MEA with the conventional GDL containing both GDB and MPL (left) and of cross-section of the single-layered titanium foam GDL (right) fabricated through freeze casting in this study. FIG. 3 shows SEM images of two different gas diffusion layers. The image on the left shows a typical membrane electrode assembly (MEA) with a conventional gas diffusion layer (GDL) 303 containing both gas diffusion backing layer (GDB) 301 and microporous layer (MPL) 302. There is a catalyst layer and nafion membrane 304. The image on the right shows a magnified cross-section of one implementation of the invention, which is a single-layered titanium foam GDL 201 fabricated through freeze casting.

Figure 4A:
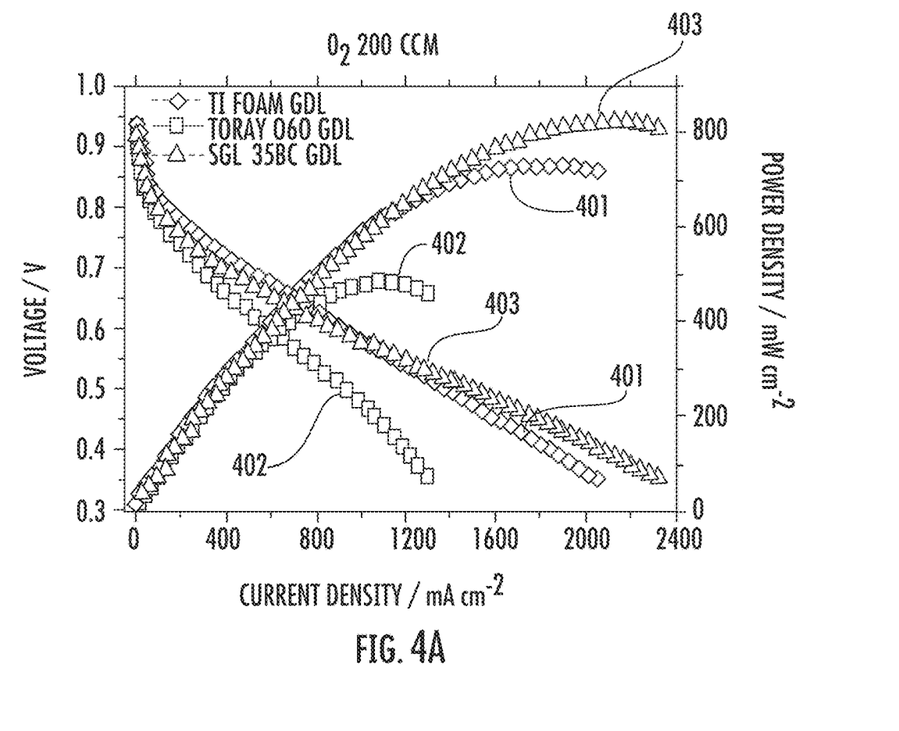
FIGS. 4A and 4B show comparisons of membrane electrode assembly anode performance of the titanium foam and conventional gas diffusion layers.
Figure 4B:
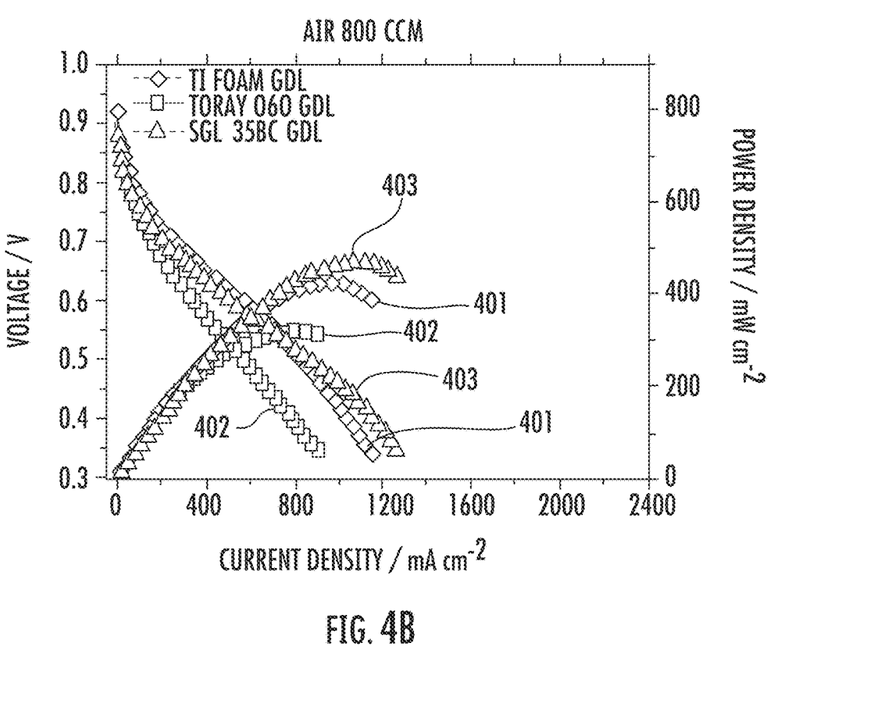

FIGS. 4A and 4B show comparisons of MEA anode performance of the titanium foam and conventional GDLs: Single-cell polarization curves of the MEAs with the titanium-foam anode GDL and conventional GDLs with supplies of (a) 200 cubic centimeters oxygen and (b) 800 cubic centimeters air. FIGS. 4A and 4B compare the performances of two anodes of membrane electrode assembly (MEA), where one anode is formed with titanium foam and the other anode is formed with conventional gas diffusion layer (GDL). In FIG. 4A, single-cell polarization curves are shown for a MEA with a titanium foam anode GDL (curves 401) and two other MEAs with conventional GDLs, such as Toray 060 GDL (curves 402) and SGL 35BC GDL (curves 403), while the MEAs were supplied with 200 cubic centimeters per minute of O2 (oxygen). In FIG. 4B, single-cell polarization curves are shown for a MEA with a titanium foam anode GDL (curves 401) and two other MEAs with conventional GDLs, such as Toray 060 GDL (curves 402) and SGL 35BC GDL (curves 403) while the MEAs were supplied with 800 cubic centimeters per minute of air.

Some appropriate metals which can be used for the metal foam of the present invention include one or a combination of more than one metal from the following metals: platinum, palladium, titanium, nickel, copper, aluminum, zirconium, tungsten, cobalt, manganese, magnesium, bismuth, chromium, silver, gold, niobium, tantalum, silicon, iridium, indium, molybdenum, zinc, tin, antimony, and stainless steel and their alloys.

The manufacturing process of the porous metal foam is not restricted to a single method but can be achieved via another metal-foam processing method, such as powder sintering, space holder methods, ice-templating, dealloying, electroplating, electroless plating, or chemical vapor deposition (CVD).

Some techniques to synthesize open cell structural foams include powder sintering, electroplating, or electroless plating, or combinations of these. Powder sintering is a relatively easy and readily available technique to synthesize open cell structural foams. One can use this technology to create open-cell structural metal foams after compressing the powder at room temperature to form a green body and sintering this at high temperature.

For electroplating and electroless plating, metal ions in a solution are plated onto a premade polymeric template. The premade polymeric template is later removed by heat or chemical treatments. In a specific technique, electroless plating deposits a thin layer of nickel or copper onto any material. The material is immersed in a liquid bath containing nickel or copper ions to be deposited.

Another technique is a space holder method. This technique includes mixing the space holder and metal powder together, removing the space holder, and leaving behind the pore spaces. For example, after a heat treatment or chemical treatment on the mixture of salt powder and metal powder, the salt powder just acts as a space holder and can be rinsed and removed by water. In addition, polymer particles or low melting-point metals such as tin, magnesium, or zinc can also be used as a space holder, since they can be molten away.

Another technique is an ice-templating method. This technique includes the following steps. First, make a slurry by mixing ceramic, metal, or polymer powder with water and binder. Then, immerse the copper rod into liquid nitrogen and control the temperature at the copper rod. And then pour the slurry on it. Once the metal powders are frozen between the ice dendrites, one can dry the ice below the freezing point using a freeze dryer. Then, the porous green body structure will be formed in the space formerly occupied by the ice dendrites. Using liquid nitrogen in the cooling step with the metal rod leads to a faster cooling rate, which results in relatively very small pores, on the order of tens of microns in diameter for titanium metal foam. Some parameters that can affect the results of this process include the metal powder size, binder type, heat treatment temperature. A three-dimensionally constructed porous metal foam will be formed once the porous green body is sintered at a high temperature. An advantage of using ice-templating is that a directional porous structure can be obtained, because the ordered directional channels help provide a smooth flow of a gas or water fluid in fuel cells.

Another technique is a dealloying method. Dealloying can be used to create metal foams with nanosized pores. A metal alloy will be formed with two or more metallic elements. Generally, the two or more metallic elements in the alloy have sufficient differences in electrochemical potentials in which one metal element is less noble and selectively etched away using a particular etching solution, and then the more noble metal element remains nanoporous. In this case, it is particularly emphasized that the selective etching is only possible when there is a sufficient electrochemical potential difference between the two elements.

An additional step when using electroless plating is to include a pretreatment step for plating metal onto the surface of a polymeric foam template in order to provide a catalytic reduction sites for the metal ions. This pretreatment process usually involves immersing the polymer template into solutions containing tin and palladium ions. After this, the foam structure is immersed in metal ionic solution such as nickel and copper. A pure metallic foam is finally fabricated after eliminating the polymer template by chemical or heat treatment. On the other hand, the removal process of the polymer template can be skipped or omitted if the metallic foam is to be used as an electrode and catalytic reaction takes place only on the surface of the polymer template.

Electroplating is a similar process to electroless plating except that it uses electricity for the surface coating of the template material using the principle of electrolysis. The polymer template surface is provided with conductivity through a pretreatment step. In addition, a metal foam is synthesized out of the polymeric template foam using the same or similar plating process as that used in electroless plating, with supply of electric current. The advantage of electroplating is that it has a faster plating rate and a high purity in the coating layer. However, the thickness of the plating layer is unlikely to be as uniform as that from using the electroless plating technique.

The gas diffusion layer with porous metal foam, which is manufactured by a method or a combination of more than one method from the above processes, can be applied to either the cathode or anode, or to both.

Another aspect of the present invention relates to the ice-templating method.

As an example of making such a GDL with metal foam as electrode, the following ice-templating process can be used:

(a) Immerse a copper rod (or other metal with a sufficient high thermal conductivity) into liquid nitrogen and pour the metal slurry that is mixed with water (a freezing medium) and binder.

Copper has one of the highest thermal conductivities among metals, and this results in having a very high thermal gradient in the slurry resulting in a distribution of relatively small pores. Other metals can be used too. However, other metals having lower thermal conductivity will result in different microstructure. For example, an iron rod can be used to have less thermal gradient in the slurry, which will result in larger pores than when using copper.

(b) Freeze the metal particles, where the metal particles are interposed between the directionally grown ice dendrites.

(c) Form the porous structure by drying the ice of the slurry below the freezing point, leaving pores in their place and forming well-aligned porous channels.

(d) Form the final porous metal foam product by sintering the porous green-body structure in a vacuum furnace.

(e) Cut the porous metal foam into thin layers, and then attaching a thin layer of the porous metal foam to the polymer electrolyte membrane to act as a gas diffusion layer in a fuel cell.

For the attachment of a gas diffusion layer formed of porous metal foam to a catalyst layer, you can use more processes than the process described in the above step (e).

The construction method of GDL with metal foam is not limited to the configuration described in the step (e). For example, the GDL with metal foam can be first attached to a catalyst layer and then the whole GDL including the porous metal foam and the catalyst layer can be attached to a polymer electrolyte membrane. Or a catalyst layer can be attached onto the polymer electrolyte membrane, onto which a metal foam layer can then be attached.

Catalysts in the catalyst layer can be selected from a group consisting of platinum catalyst, platinum metal (Pt-M) alloy catalyst (where M can represent copper, cobalt, nickel, palladium, manganese, chromium, or iron), metal platinum (M-Pt) core shell structured catalyst, or from a group consisting of non-platinum catalyst, such as cobalt/polyaniline/carbon nanotubes (Co/PANI/CNT), iron/cobalt/carbon (Fe/Co/C), or tungsten carbide/iron/polyaniline (WC/Fe/PANI).

In step (e), methods of attaching a platinum-type catalyst include but are not limited to: spraying, sputtering, electrochemical deposition, or atomic layer deposition.

In the step (a) above, the temperature of the freezing process with liquid nitrogen should be at most −5 degrees Celsius or less for more than two hours.

In step (d), it is desirable to remove the binder that is in the furnace at about 300 degrees Celsius, and sinter the porous green-body structure at a higher temperature for at least several hours. The sintering temperature depends on the melting temperature of the metal; the sintering temperature is approximately two thirds of the melting point.

Hereinafter, embodiments of the present invention will be described in detail. While examples of the illustrated embodiments are described in detail, the descriptions and embodiments are not intended to limit the scope of the claimed invention.

Sample Embodiments

Sample Embodiments: Fuel Cell Manufacturing

A metal foam was fabricated by an ice-templating technique that is described here. A metal slurry was prepared by mixing 11.25 grams of titanium powder, 10 milliliters of pure water, and binder (e.g., polyvinyl alcohol or PVA). The metal slurry was frozen for more than two hours on top of a copper rod that was cooled in liquid nitrogen. Only the ice in the frozen metal slurry was dried away using a freeze dryer. As the ice dendrites were removed, leaving the porous channels behind, a green-body titanium foam was formed. Titanium metal foam was finally completed once the titanium green-body was heat-treated for three hours at 300 degrees Celsius and six hours at 1150 degrees Celsius. The metal foam gas diffusion layer is completed after the titanium foam was cut to a thickness of less than 230 microns.

Experimental Embodiments: Performance Evaluation of the Unit Cell Battery

To evaluate electrochemical characteristics, the unit cell manufactured with the titanium metal foam MEA in the previously mentioned embodiments was tested. The reaction area of the unit cell was 5 square centimeters. And the MEA was assembled with the GDL attached between graphite sheets in a serpentine flow field.

Torque wrench was used to maintain the unit cell at a constant pressure. The anode side of the unit cell in the evaluation machine was supplied with humidified hydrogen gas at 75 degrees Celsius and the cathode side was supplied with humidified oxygen (or air) gas at 70 degrees Celsius, with a stoichiometric ratio of 1.5/2. The unit cell was evaluated at a constant temperature of 70 degrees Celsius under atmospheric pressure.

Experimental Conditions

Anode: H2 (hydrogen) 150 cubic centimeters per minute, 40 weight percent (wt %) JM Pt/C 0.2 milligrams per square centimeter, Titanium metal foam Cathode: O2 (oxygen) 200 cubic centimeters per minute or air cubic centimeters per minute at 70 degrees Celsius, 40 percent weight Johnson-Matthey Pt/C 0.2 milligrams per square centimeter, Sigracet Gas Diffusion Media Type GDL 35BC Cell: 70 degrees Celsius, active area 1.21 square centimeters Electrochemical Performance Result IVP curves of the experimental (titanium metal GDL) and comparisons (Toray 060 and SGL 35BC) are shown in FIGS. 4A and 4B with supplies of oxygen and air, respectively. At a typical standard value of 0.7 volts, current densities of the experimental, and the conventional Toray and SGL examples were 462, 278, and 375 milliamps per square centimeter, respectively, when oxygen was supplied. The experimental value showed a 166 percent increase in efficiency as compared to the Toray comparison value. When air was supplied instead, the current densities of the experimental and comparison Toray and SGL examples were 262, 158, and 216 milliamps per square centimeter, respectively, and the experimental data showed a 166 percent increase in efficiency as compared to the Toray comparison.

The above experimental results are also displayed in the table below.

TABLE

| Material | Current density at 0.7 V (mA per sq cm) | |
|---|---|---|
| | O2 200 ccm | Air 800 ccm |
| Toray 060 GDL | 278 | 158 |
| SGL 35BC | 375 | 216 |
| Ti foam anode GDL | 462 | 262 |

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of making a fuel cell comprising:
   forming a first porous metal foam component, wherein the first porous metal foam comprises a plurality of pores aligned in a first direction, and the forming of the first porous metal foam component comprises
   immersing a copper rod into liquid nitrogen and placing onto the copper rod a slurry containing water, binder, and metal particles,
   lowering a temperature of the slurry to form ice dendrites, wherein the metal particles interposed between the ice dendrites become frozen,
   forming a green-body porous structure by freeze drying the ice dendrites in the slurry below a freezing point of the water, forming a metal foam structure by sintering the porous green-body structure in a vacuum furnace, and machining the metal foam structure into the first porous metal foam component comprising a thickness of less than 230 microns;

forming a second porous metal foam component, wherein the second porous metal foam comprises a plurality of pores aligned in the first direction;

using the first porous metal foam as a first electrode of the fuel cell;

using the second porous metal foam as a second electrode of the fuel cell;

forming an electrolyte between the first and second electrodes;

forming a first catalyst between the first electrode and the electrolyte; and forming a second catalyst between the second electrode and the electrolyte.

2. The method of claim 1, wherein the first direction is transverse to an interface between the first electrode and the first catalyst, and transverse to an interface between the second electrode and the second catalyst.

3. The method of claim 1, wherein the thickness of the first porous metal foam component in the first direction is greater than a thickness of the first catalyst.

4. The method of claim 1, wherein electrons flow from the first electrode to the second electrode, without passing through the electrolyte.

5. The method of claim 1, wherein the metal particles are selected from the group of the following metals and their alloys: platinum, palladium, titanium, nickel, copper, aluminum, zirconium, tungsten, cobalt, manganese, magnesium, bismuth, chromium, silver, gold, niobium, tantalum, silicon, iridium, indium, molybdenum, zinc, tin, antimony, and stainless steel.

6. The method of claim wherein the first porous metal foam component is an electrical conductor.

7. The method of claim 1, wherein the first porous metal foam component is a titanium metal foam.

8. The method of claim wherein the metal particles are titanium particles.

9. The method of claim 1, wherein the metal particles are titanium particles, and the first porous metal foam component is an anode of the fuel cell.

10. The method of claim wherein the first porous metal foam component is a titanium metal foam and comprises pores comprising a pore diameter on the order of tens of microns in diameter.

11. The method of claim 1, wherein the binder comprises polyvinyl alcohol.

12. The method of claim 1, wherein the first catalyst is selected from the group of the following catalysts: platinum catalyst, platinum-metal alloy catalyst, platinum-copper alloy catalyst, platinum-cobalt alloy catalyst, platinum-nickel alloy catalyst, platinum-palladium alloy catalyst, platinum-manganese alloy catalyst, platinum-chromium alloy catalyst, platinum-iron-alloy catalyst, metal-platinum core shell structured catalyst, copper-platinum core shell structured catalyst, cobalt-platinum core shell structured catalyst, nickel-platinum core shell structured catalyst, palladium-platinum core shell structured catalyst, manganese-platinum core shell structured catalyst, chromium-platinum core shell structured catalyst, and iron-platinum core shell structured catalyst.

13. The method of claim 1, wherein the first catalyst is selected from the group of non-platinum catalysts as follows: cobalt/polyaniline/carbon nanotubes (Co/PANI/CNT), iron/cobalt/carbon (Fe/Co/C), and tungsten carbide/iron/polyaniline (WC/Fe/PANI).

14. The method of claim 1, wherein the forming the second first porous metal foam component comprises machining the metal foam structure into the second porous metal foam component comprising a thickness of less than 230 microns.

15. The method of claim 1, wherein the forming a metal foam structure by sintering comprises:
heat treating the porous green-body structure in the vacuum furnace at a first temperature for a first time period; and
heat treating the porous green-body structure in the vacuum furnace at a second temperature for a second time period, wherein the second temperature is higher than the first temperature, and
the first time period comprises three hours, and the second time period comprises six hours.

16. The method of claim 15, wherein the first temperature is 300 degrees Celsius, and the second temperature is 1150 degrees Celsius.

17. The method of claim 1, wherein the forming first porous metal foam component comprises coupling the first porous metal foam component to a polymer electrolyte membrane of the fuel cell, wherein first porous metal foam component acts as a gas diffusion layer of the fuel cell.

18. The method of claim 17, comprising attaching the first catalyst directly to the first porous metal foam component before the first porous metal foam component with attached first catalyst are attached to the polymer electrolyte membrane.

19. The method of claim 18, wherein a method of attaching the first catalyst comprises at least one of the following: spraying, sputtering, electrochemical deposition, or atomic layer deposition.

20. The method of claim 17, comprising attaching the polymer electrolyte membrane to the first catalyst and then attaching the first porous metal foam component to the polymer electrolyte membrane with attached first catalyst.

\* \* \* \* \*

UNITED STATES PATENT AND TRADEMARK OFFICE
CERTIFICATE OF CORRECTION

PATENT NO. : 11,658,308 B2
APPLICATION NO. : 17/202145
DATED : May 23, 2023
INVENTOR(S) : Yong-Hun Cho et al.

It is certified that error appears in the above-identified patent and that said Letters Patent is hereby corrected as shown below:

In the Specification

Column 11, Lines 36, 40, and 45, after "claim", insert --1,--.

Signed and Sealed this
Fourth Day of July, 2023

Katherine Kelly Vidal
*Director of the United States Patent and Trademark Office*